Patented Jan. 15, 1946

2,392,853

UNITED STATES PATENT OFFICE 2,392,853

REFINING OF PETROLEUM HYDROCARBON WAXES

Anthony Kinsel, Petrolia, Pa., assignor to L. Sonneborn Sons, Inc., a corporation of Delaware No Drawing. Application September 1, 1944, Serial No. 552,389

7 Claims. (Cl. 196—21)

This invention relates to new and useful improvements in the refining of petroleum residual waxes.

In the conventional refining of raw petroleum residual waxes, the refining treatment includes the steps of melting the raw material and filtering the molten product through suitable adsorbents. With certain types of raw stocks, however, relatively low filtration yields are obtained. For the purpose of increasing the filtration yields of such stocks the molten product is first treated with aluminum chloride before filtering the same. In this manner filtration yields are considerably increased. The aluminum chloride treatment, however, will impart to the resulting product corrosive properties due to the presence of organic chlorides and aluminum chloride hydrocarbon complexes and/or the decomposition products thereof. Attempts have been repeatedly made to eliminate or ameliorate this drawback of aluminum chloride treatment by, for instance, the addition of caustic, without, however, appreciably improving the corrosive characteristics of the resulting product.

I have discovered that when treating the raw petroleum residual wax resulting from the aluminum chloride treatment of such wax with relatively small amounts of alkali or alkaline earth metal plumbite, such as sodium-, potassium-, calcium-, barium-, or the like plumbite, deleterious corrosion imparting substances are substantially eliminated from the product.

The invention is applicable to petroleum residual waxes both of the oil-free and oil-containing type, such as micro-crystalline waxes, petrolatum and others.

Within the preferred embodiment of my invention the plumbite and preferably sodium plumbite is used in the form of its aqueous solution, the solution being finely suspended in the liquefied or molten raw product. The reaction temperatures may vary, depending upon type and characteristics of wax used. In the majority of cases, however, temperatures in excess of 150° F. and preferably in excess of 180° F. give satisfactory results. The heating should be carried out at least at the melting point of the wax and preferably at least at 150° F. and for best results at least at 180° F. and below the decomposition point of the wax. If desired, an alcoholic plumbite solution may be used. The duration of heating is dependent upon the time required for completion of the reaction, i. e., elimination of corrosive substances that are determinable in the form of ascertainable hydrochloric acidity of the product.

This hydrochloric acidity of the product may be determined by steam distilling a sample of the reaction product in the usual manner and titrating the hydrochloric acid in the distillate with standard caustic solution. Ordinarily, reaction is completed in a relatively short period of time.

The concentration of plumbite is not critical. The necessary amount of plumbite is ordinarily determined by the amount of hydrochloric acidity ascertained for the raw material to be treated. For satisfactory results it is recommended to add an amount of plumbite in excess of that corresponding to the equivalent weight of predetermined hydrochloric acidity of the aluminum chloride treated stock. After the completion of the sodium plumbite treatment the resulting reaction product is then washed and distilled in the normal manner.

Within the preferred scope of my invention a sodium plumbite solution may be prepared, for instance, by dissolving lead oxide (PbO) in an aqueous causttic alkali solution of suitable strength to obtain a substantially saturated sodium plumbite solution. For satisfactory results, for instance, 6 to 7% of PbO may be added to a solution of 12.5% NaOH in water. The solubility of PbO in caustic soda of the above strength is usually between 2 and 4%, depending on the grade of PbO used, so that in this case there is a surplus of PbO present and the sodium plumbite solution formed is saturated under the conditions stated.

It is of advantage to use a surplus of the plumbite solution, which after use may be drawn off and again brought up to its approximate original strength by addition of caustic and PbO till the solution becomes finally saturated with NaCl, the same being then discarded or suitably worked up.

Within the purview of my invention, it is in many cases of advantage to use the residual wax in a suitable solvent solution. Any of the conventional solvents used for wax treatments, such as naphtha or the like, may be used for this purpose. When proceeding in this manner the sodium plumbite reaction may be carried on at temperatures lower than 150° F. depending upon particular considerations or conditions.

The following examples are furnished by way of illustration and not of limitation:

*Example I*

An aluminum chloride treated amorphous wax having a melting point of about 135° F. was analyzed for hydrochloric acidity and found to contain such acidity in amount equivalent to 1.90 mgs. KOH per gram. This product was dissolved in naphtha to the extent of a 50% solution and treated for half an hour between 150 and 180° F. with a saturated caustic soda sodium plumbite solution prepared by dissolving 12.5% NaOH in water and adding thereto about 7% of PbO. The amount of caustic soda sodium plumbite solution added was 10% of the wax in solution. The resulting product was permitted to settle and was then washed with water to remove substantially all free sodium plumbite and was then steam distilled for removal of solvent. The remaining product, titrated for acidity (HCl) showed an amount of hydrochloric acidity equivalent to .002 mg. KOH per gram.

Example II

A petrolatum stock of a melting point of 115-120° F. resulting from the aluminum chloride treatment of raw petrolatum stock and having a predetermined hydrochloric acidity in excess of 1.5 mgs. KOH per gram was subjected to the same plumbite treatment and under substantially the same reaction conditions as to solvent, time, temperature and amounts set forth in Example I. The product remaining, after removal of solvent, was found to be substantially free from hydrochloric acidity.

Example III

A saturated caustic soda sodium plumbite solution prepared as set forth in Example I was suspended in a molten aluminum chloride treated petrolatum stock of the characteristics including acidity set forth in Example II. The suspension was heated for one-half hour between 150° F. and 180° F. The resulting product was then filtered while in molten condition. The filtrate, tested for acidity (HCl) showed substantial freedom from hydrochloric acidity.

The foregoing specific description is for purposes of illustration and not of limitation and it is therefore my intention that the invention be limited only by the appended claims or their equivalents wherein I have endeavored to claim broadly all inherent novelty.

I claim:

1. In the method of refining a petroleum residual wax which has been subjected to aluminum chloride treatment and containing as a result of such treatment aluminum chloride induced corrosive substances, the improvement comprising reacting such wax with a relatively small amount of a plumbite selected from the group consisting of alkali and alkaline earth metal plumbites, and recovering from the reaction mix a petroleum residual wax substantially free from such aluminum chloride induced corrosive substances.

2. In the method of refining a petroleum residual wax which has been subjected to aluminum chloride treatment and containing as a result of such treatment aluminum chloride induced corrosive substances, the improvement comprising reacting such wax while in molten condition with a substantially saturated aqueous solution of plumbite selected from the group consisting of alkali and alkaline earth metal plumbites, said plumbite being present in said aqueous solution in amount in excess of that corresponding to the equivalent weight of predetermined hydrochloric acidity of such wax, and thereafter recovering from the reaction product a petroleum residual wax substantially free from such aluminum chloride induced corrosive substances.

3. In the method of refining a petroleum residual wax which has been subjected to aluminum chloride treatment and containing as a result of such treatment aluminum chloride induced corrosive substances, the improvement comprising reacting such wax in organic solvent solution with a substantially saturated aqueous solution of a plumbite selected from the group consisting of alkali and alkaline earth metal plumbites, said plumbite being present in said aqueous solution in amount in excess of that corresponding to the equivalent weight of predetermined hydrochloric acidity of such wax, and thereafter recovering from the reaction product a petroleum residual wax substantially free from such aluminum chloride induced corrosive substances.

4. In the method of refining a petroleum residual wax, the improvement in accordance with claim 3 in which said wax is reacted with said plumbite solution at a temperature in excess of 150° F.

5. In the method of refining a petroleum residual wax which has been subjected to aluminum chloride treatment and containing as a result of such treatment aluminum chloride induced corrosive substances, the improvement comprising finely dispersing an aqueous caustic alkali solution of alkali metal plumbite in such wax while in molten condition, said plumbite being present in said aqueous solution in amount in excess of that corresponding to the equivalent weight of predetermined hydrochloric acidity of such wax, reacting said plumbite solution with said wax at above the melting point of said wax, thereafter separating the aqueous phase from the waxy phase, and recovering from said waxy phase a petroleum residual wax substantially free from such aluminum chloride induced corrosive substances.

6. In the method of refining a petroleum residual wax which has been subjected to aluminum chloride treatment and containing as a result of such treatment aluminum chloride induced corrosive substances, the improvement comprising reacting at a temperature of at least 150° F. a solution of such wax in an organic solvent with a saturated aqueous caustic alkali solution of alkali metal plumbite, said plumbite being present in said aqueous solution in amount in excess of that corresponding to the equivalent weight of predetermined hydrochloric acidity of such wax, separating the reaction product into an aqueous phase and a solvent phase, removing the solvent from the solvent phase and recovering from the residue of the solvent phase a petroleum residual wax substantially free from aluminum chloride induced corrosive substances.

7. In the method of refining a petroleum residual wax, the improvement in accordance with claim 6 in which said aqueous plumbite solution is a sodium plumbite solution and in which said organic solvent is naphtha.

ANTHONY KINSEL.